US008019795B2

(12) United States Patent
Anderson et al.

(10) Patent No.: US 8,019,795 B2
(45) Date of Patent: Sep. 13, 2011

(54) DATA WAREHOUSE TEST AUTOMATION FRAMEWORK

(75) Inventors: Andrew Anderson, Bellevue, WA (US);
Kanmin Zhang, Bellevue, WA (US);
Steven Long, Bellevue, WA (US);
Joseph Heiniger, Redmond, WA (US);
Ashutosh Badwe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 354 days.

(21) Appl. No.: 11/951,323

(22) Filed: Dec. 5, 2007

(65) Prior Publication Data

US 2009/0150447 A1 Jun. 11, 2009

(51) Int. Cl.
*G06F 17/30* (2006.01)

(52) U.S. Cl. ........ 707/803; 707/600; 707/687; 707/690; 707/697; 707/703; 358/1.13

(58) Field of Classification Search .................. 395/785; 358/1.13
See application file for complete search history.

(56) References Cited

U.S. PATENT DOCUMENTS

| | | | | |
|---|---|---|---|---|
| 5,598,370 | A * | 1/1997 | Niijima et al. | 365/185.33 |
| 5,706,494 | A | 1/1998 | Cochrane et al. | |
| 6,272,640 | B1 * | 8/2001 | Sokol | 726/23 |
| 6,633,875 | B2 | 10/2003 | Brady | |
| 6,668,253 | B1 | 12/2003 | Thompson et al. | |
| 6,714,979 | B1 * | 3/2004 | Brandt et al. | 709/225 |
| 6,768,986 | B2 | 7/2004 | Cras et al. | |
| 6,922,685 | B2 | 7/2005 | Greene et al. | |
| 7,203,671 | B1 * | 4/2007 | Wong | 1/1 |
| 7,564,907 | B2 * | 7/2009 | Walker et al. | 375/260 |
| 7,720,804 | B2 * | 5/2010 | Fazal et al. | 707/601 |
| 2002/0184133 | A1 | 12/2002 | Zangari et al. | |
| 2003/0061131 | A1 * | 3/2003 | Parkan, Jr. | 705/30 |
| 2005/0004918 | A1 | 1/2005 | Platt | |
| 2006/0007464 | A1 * | 1/2006 | Percey | 358/1.13 |
| 2006/0041569 | A1 | 2/2006 | Beck et al. | |
| 2007/0016593 | A1 * | 1/2007 | Lieske et al. | 707/100 |
| 2007/0174308 | A1 * | 7/2007 | Rausch | 707/100 |
| 2007/0203933 | A1 * | 8/2007 | Iversen et al. | 707/102 |
| 2007/0233648 | A1 * | 10/2007 | Zuzarte | 707/3 |
| 2007/0239508 | A1 * | 10/2007 | Fazal et al. | 705/8 |
| 2007/0239769 | A1 * | 10/2007 | Fazal et al. | 707/102 |
| 2008/0239969 | A1 * | 10/2008 | He et al. | 370/241.1 |
| 2009/0031128 | A1 * | 1/2009 | French et al. | 713/164 |

OTHER PUBLICATIONS

"15 Maintaining the Data Warehouse", http://download.oracle.com/docs/cd/B19306_01/server.102/b14223/refresh.htm.
Chaudhuri, et al., "Robust and Efficient Fuzzy Match for Online Data Cleaning", Proceedings of the 2003 ACM SIGMOD, Date: 2003,pp. 313-324.
Karakasidis, et al., "ETL Queues for Active Data Warehousing", Proceedings of the 2nd international workshop on Information quality in information systems, Date: 2005, pp. 28-39.

* cited by examiner

*Primary Examiner* — Shahid Alam
*Assistant Examiner* — Andalib Lodhi (57) ABSTRACT

Various technologies and techniques are disclosed for providing a data warehouse test automation framework system. A data generation module is provided that is operable to generate data scenarios that ensure specific logic is being validated against a data warehouse. A data validation module is provided that has data validation blocks that provide a framework for validating data completeness and data integrity of a data warehouse. The data validation blocks are represented by query templates that provide specifications for how queries that perform the validating of the data completeness and the data integrity should be structured. Dimensions in the data warehouse are modeled using an object oriented programming syntax.

17 Claims, 12 Drawing Sheets

DATA WAREHOUSE TEST AUTOMATION FRAMEWORK

BACKGROUND

A data warehouse is a repository of a company's historical data, and contains the data for decision support systems. Data warehouses are designed to allow a data analyst to perform complex queries and analysis on the information without slowing down the day-to-day operational systems. In other words, data warehouses are optimized for reporting and analysis, which is why they are often referred to as online analytical processing (OLAP) databases. In order to achieve this end goal of complex analysis of historical data with reasonable response times, data in data warehouses is typically stored in a dimension-based model. Data is typically organized so that data elements that relate to the same object in the real world are linked together. Data warehouses typically follow a de-normalized approach to structuring data, where the fast access to summary information is more important than going to great extents to avoid duplication of data across multiple tables. Since data warehouses are typically read-only for historical analysis, there is usually less concern about data duplication, and the same information may be contained in multiple tables where that information might be relevant.

On the other hand, online transaction processing (OLTP) databases are typically used to handle the day-to-day operations of a business, where data is being regularly added and modified. OLTP systems are typically designed for speed of modification so that the response time is good for processing each transaction. In OLTP databases, the database structure typically follows a normalized approach, which follows certain rules for avoiding duplication of data and other general design practices that help ensure optimum performance for data that is updated regularly. For example, in an OLTP database, the customer name and address may only be present in a customer detail table to avoid duplication of data, and to ensure that only one copy of that record is maintained. That same information may be contained in multiple tables in a data warehouse. In another example, one table in a data warehouse may provide sales details, with the customer name and address duplicated for each sales record. That data warehouse may also have a customer table that contains the name and address details. While this duplication of data would violate good design rules for an OLTP database, it can be appropriate practice for a data warehouse since speed of answering specific business questions is the primary concern, and the data is not being updated (which would be very difficult to achieve when the same data is contained in multiple places).

In order to generate a data warehouse, a transformation process is typically used to transform the data in the OLTP database into the format used by the data warehouse. This transformation process is often referred to as an extract, transform, and load (ETL) process that involves extracting data from outside sources, transforming it to fit business needs, and ultimately loading it into the end target, i.e. the data warehouse. This ETL transformation process typically involves the transformation of the normalized database tables in the OLTP database into data structures with various dimensions in the data warehouse. Since the structure of an OLTP database is very different from the structure of a data warehouse, the results of the transformation from OLTP data tables to data warehouse tables should be analyzed to ensure the desired end result was actually achieved. In the very simple example introduced earlier, verification would be needed, among other things, to ensure that the customer detail information was propagated correctly from just the single table in the relational database to the multiple tables in the data warehouse. This verification process can become very tedious and prone to errors, especially for data warehouses that have any sort of complexity, which most of them do.

SUMMARY

Various technologies and techniques are disclosed for providing a data warehouse test automation framework system. A data generation module is provided that is operable to generate data scenarios that ensure specific logic is being validated against a data warehouse. A data validation module is provided that has data validation blocks that provide a framework for validating data completeness and data integrity of a data warehouse. The data validation blocks are represented by query templates that provide specifications for how queries that perform the validating of the data completeness and the data integrity should be structured. Dimensions in the test automation framework are modeled using an object oriented programming syntax.

In one implementation, rejections are processed as source data is fed into a data warehouse. As source data is fed into a data warehouse, rejection logic is applied to the source data to determine if the source data is valid. A validity indicator is populated for each row of the source data that marks whether each row of the source data is valid. The validity indicator is used with one or more validation query templates to determine whether the source data was transformed into destination data as expected.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as a framework for validating data warehouses, but the technologies and techniques also serve other purposes in addition to these. In one implementation, one or more of the techniques described herein can be implemented as features within a database program such as MICROSOFT® SQL Server, or from any other type of program or service that validates and/or interacts with data warehouses.

Figure 1:
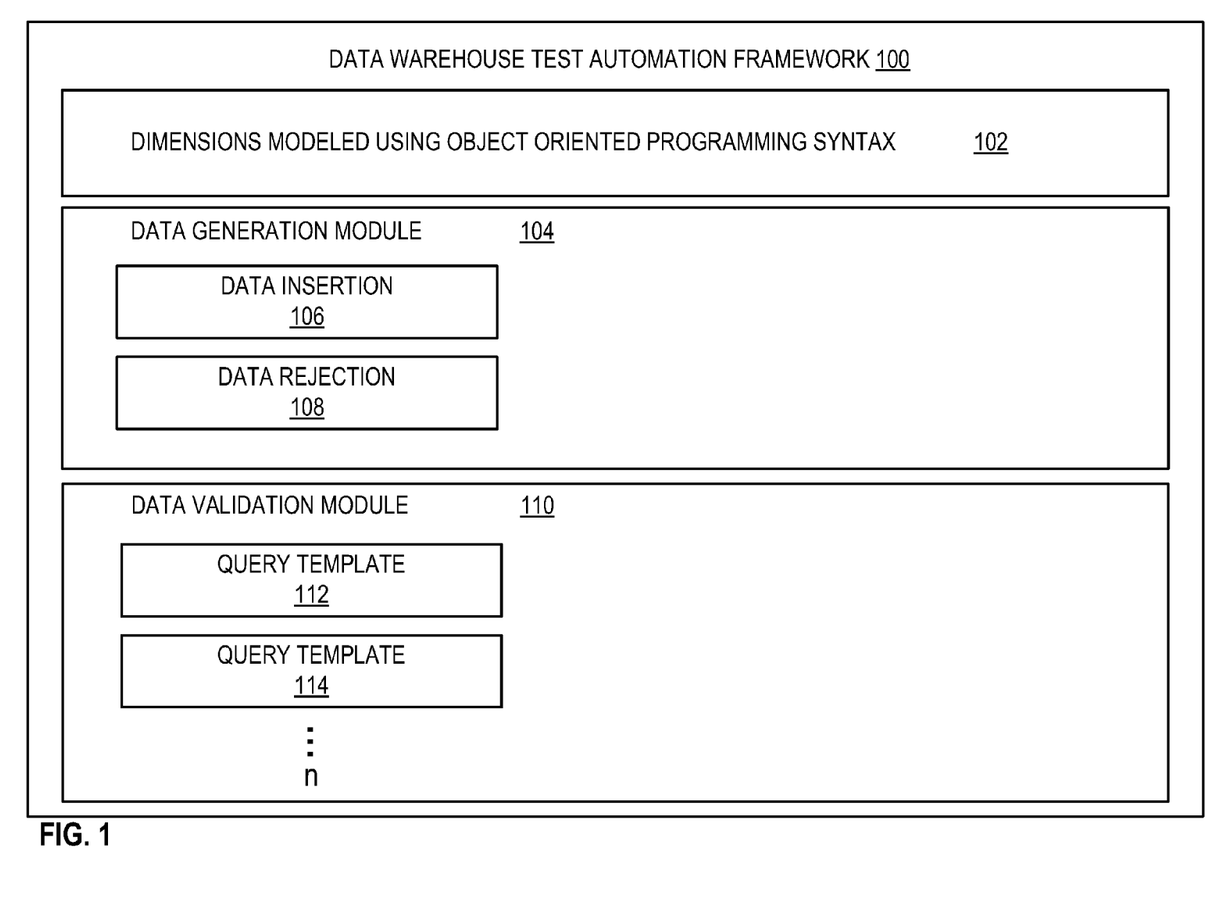
FIG. 1 is a diagrammatic view of exemplary components of a data warehouse test automation framework of one implementation.

FIG. 1 is a diagrammatic view of exemplary components of a data warehouse test automation framework 100 of one implementation. The term "data warehouse" as used herein is meant to include one or more databases, datamarts, tables, and/or other groupings of data that is/are structured for the purpose of allowing complex queries to be performed quickly to allow a user to analyze information without slowing down day-to-day operational systems. In the example shown in FIG. 1, data warehouse test automation framework 100 includes dimensions that are modeled using an object oriented programming syntax 102, a data generation module 104, and a data validation module 110. The modeling of dimensions using an object oriented programming syntax 102 is described in further detail in FIG. 2. Data generation module 104 is responsible for generating the data scenarios that ensure the specific logic is being validated. In one implementation, the data generation module 104 is designed to facilitate the generation of valid/invalid source data on the fly with minimal specification. This is described in further detail in FIGS. 3-4. In one implementation, the data generation module 104 is also designed to pre-process source data as described in FIG. 5 by marking data as either valid or invalid so that the validation queries (discussed in FIGS. 6-11) can compare the expected behavior against the data warehouse behavior.

Data validation module 110 is responsible for checking the data integrity and data completeness of a data warehouse to ensure that the destination data in the data warehouse is being properly populated from the source data store. Validation blocks in the data validation module 110 are represented in query templates (112, 114, etc.) that can be updated quickly as business logic changes. Data validation module 110 is described in further detail in FIGS. 6-11.

In one implementation, data generation module 104 is loosely coupled with the data validation module 110 to create a flexible and extensible design that ensures that specific logic is being validated. Additional test cases can be added quickly through the addition of new data/nodes (using XML or another suitable format). This approach builds flexibility and maintainability into the automation architecture, allowing for reusable test automation code and automation work that can be applied to multiple versions of a product. The structure of the framework provides complete test coverage for data warehousing projects and is modular enough to adapt to later project changes.

Figure 2:
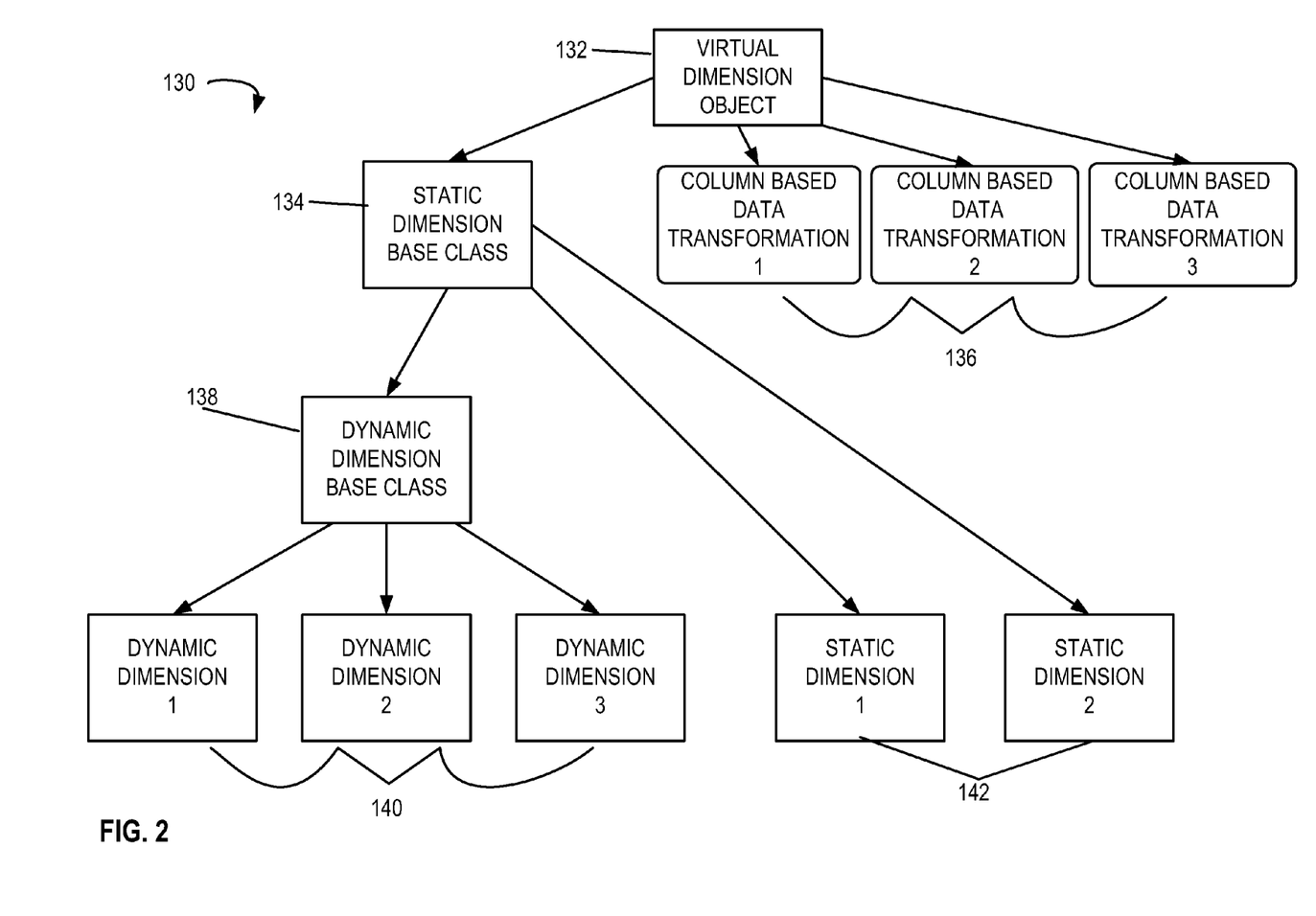
FIG. 2 is a diagrammatic view of an object oriented dimension model of one implementation.

FIG. 2 is a diagrammatic view of an object oriented dimension model 130 of one implementation. Before turning to the discussion of the dimension model 130, some definitions are first necessary. The term "dimension" as used herein is meant to include a domain of data that applies to associated fact data and represents the data set that the fact data can be summarized or sliced by. For example, a profit summary in a fact table might be viewable by a Time dimension (profit by month, day, year), a Region dimension (profit by city or state), and a Product dimension (profit for product1, product2). A "fact table" is a table that contains summarized numerical and historical data (facts) and a multipart index composed of foreign keys from the primary keys of related dimension tables.

In one implementation of the data warehouse test automation framework 100, dimensions are modeled as objects using an object oriented programming syntax 102 (as noted in FIG. 1). A virtual dimension object 132 is where the dimension object is defined. A static dimension base class 134 inherits its properties and methods from the virtual dimension object 132. Static dimensions have a static or set data domain. The total domain of data values is known and other values are rejected as invalid or they are transformed to an accepted default. The static dimension base class 134 maps the good known values to enable the modeling of transformation logic from the source systems to the system being tested. A dynamic dimension base class 138 inherits from a static dimension base class 134. Dynamic dimensions are those in which there is no set/known data domain and new values can be added during the data warehouse loading process. The dynamic dimension base class 138 is able to compare the total data domain of the sources to the system being tested.

By representing dimensions as objects using an object oriented programming language (OOP) such as C#, Visual Basic.NET, or any object oriented programming language that supports inheritance, certain validation features can be built into the design. For example, all dimensions can "know" whether a raw data event is "good" or "bad" based on methods in the dimension called data validation blocks. As noted in FIG. 1, the validation blocks can be implemented in the form of query templates which provide guidance on what the query needs to contain. By representing dimensions as objects, the common dimension based interface for rejection/transformation of raw events can be factored before they are added to the data warehouse. In one implementation, whenever a new dimension is added to the data warehouse or an existing dimension is removed, only minimal code change is required.

In one implementation, the transformation/rejection logic for dimensions is separated from the dimension objects. This separation of transformation/rejection logic from the dimension objects enables updates to dimension logic without recompiling and modifying the object oriented programming code structures and test cases calling the object oriented programming code. This separation of transformation/rejection logic from the dimension objects also allows for any language/tool that can best capture the data warehouse transformation/rejection logic to be used. In one implementation, T-SQL is used for the transformation/rejection logic, but the flexible design allows the validation logic to be captured in modules coded within the OOP language the framework is coded in, or in some other query language.

Turning now to FIGS. 3-11 with continued reference to FIGS. 1-2, the stages for implementing one or more implementations of data warehouse test automation framework 100 are described in further detail. In some implementations, the processes of FIG. 3-11 are at least partially implemented in the operating logic of computing device 500 (of FIG. 12).

Figure 3:
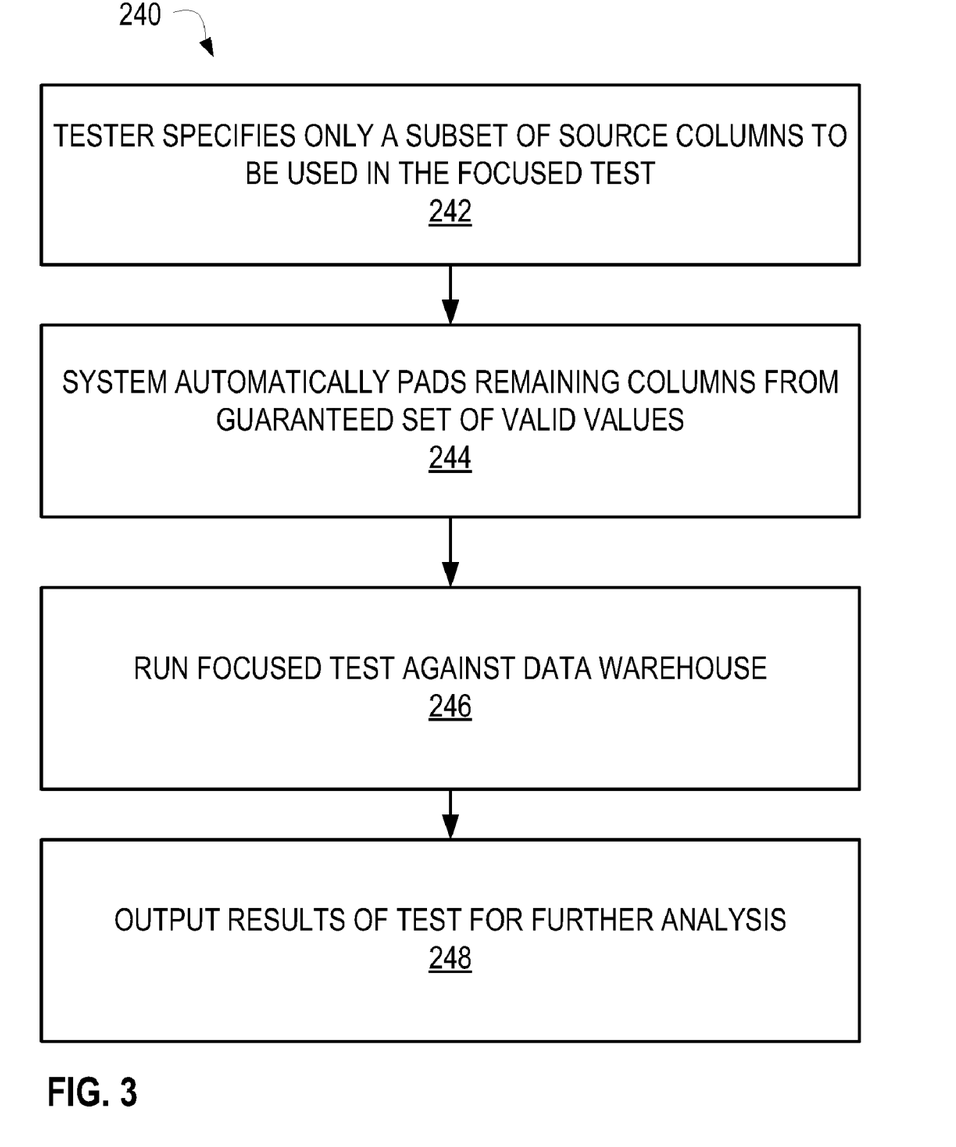
FIG. 3 is a process flow diagram of one implementation illustrating the stages involved in generating positive tests for a subset of source columns.

FIG. 3 is a process flow diagram 240 that illustrates one implementation of the stages involved in generating positive tests by inserting valid data that is expected to be accepted and processed through to the fact tables and overriding values for a subset of source columns to target specific business logic/transformation scenarios. In one implementation, the process described in FIG. 3 is one component of the data generation module 104, and more specifically, of the data insertion module 106. As noted in the discussion of FIG. 1, the data generation module 104 is designed to facilitate the generation of valid/invalid source data on the fly with minimal specification. The data generation module 104 is also designed to pre-process source data by marking data as either valid or invalid so that the validation queries discussed in FIGS. 6-11 can compare the expected behavior against the data warehouse behavior.

The data insertion module allows a tester to specify only a subset of source columns to be used in the focused test (stage 242). In one implementation, there are two sources of the data: a table that contains all required column values for testing, and input XML file(s) or any other suitable format which contains the subset values to be tested. The subset of columns includes just those columns that the tester is interested in testing. This allows focused development of tests around specific business logic. The system automatically pads remaining columns from a guaranteed set of valid values (stage 244). The system runs the focused test against a data warehouse (stage 246) and then outputs the results of the test for further analysis (stage 248).

Figure 4:
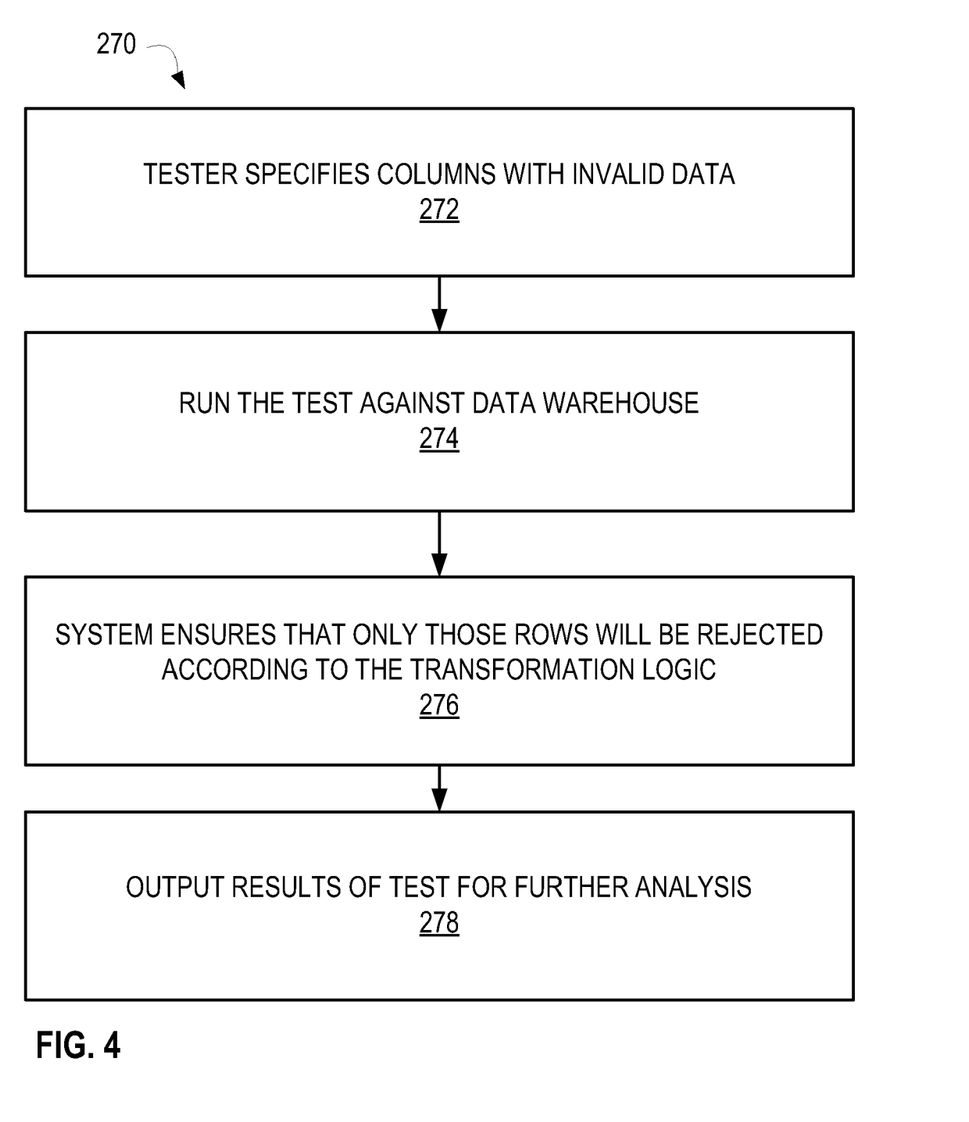
FIG. 4 is a process flow diagram for one implementation illustrating the stages involved in generating negative tests that focus on rejection logic.

FIG. 4 is a process flow diagram 270 that illustrates one implementation of the stages involved in generating negative tests that focus on rejection logic by inserting invalid data as defined in input XML files or any other suitable format. The tester specifies columns with invalid data (stage 272) and the test is run against the data warehouse (stage 274). The system ensures that only those rows will be rejected according to the transformation logic (stage 276). The results of the test are then output for further analysis (stage 278).

Figure 5:
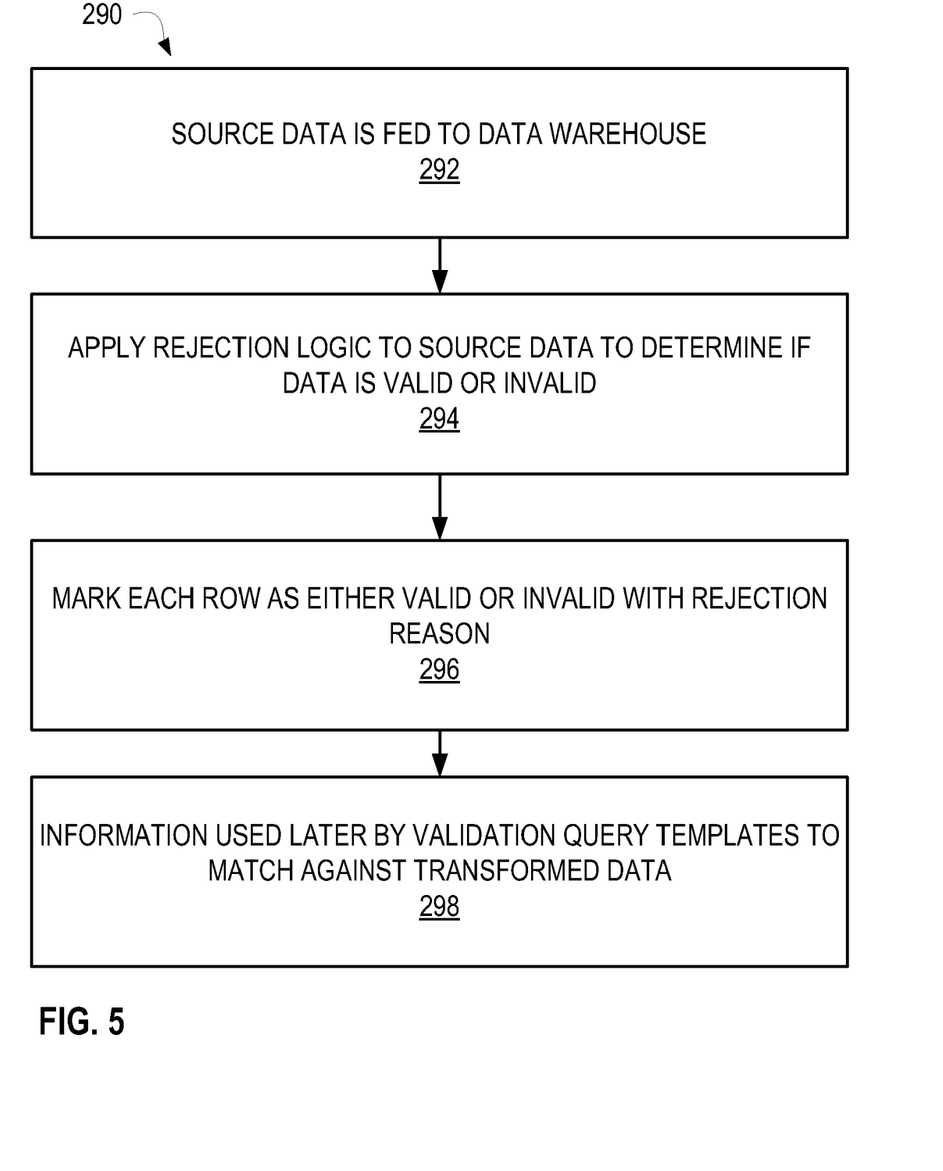
FIG. 5 is a process flow diagram for one implementation illustrating the stages involved in processing rejections as source data is fed to the data warehouse.

FIG. 5 is a process flow diagram 290 that illustrates one implementation of the stages involved in processing rejections as source data is fed to the data warehouse. The source data is fed to the data warehouse (stage 292). The system applies the rejection logic to source data to determine if the source data is valid or invalid (stage 294). Each row is then programmatically marked with a validity indicator as either being valid or invalid (stage 296). Each row that is rejected is also optionally indicated with a rejection reason (stage 296). The validity indicator and rejection reason information is used later by the validation query templates to match against the destination data (stage 298) in the data warehouse to ensure that the results are as expected. For example, a row can reference an inactive customer, not specify the region and have a future date in the Time dimension, all of which may be a reason for the rejection. But the data warehouse being tested may only reject the row based on the first reason (of the inactive customer in this example). Thus, to properly validate the real rejection reason(s), multiple rejection reasons are supported, and can be analyzed.

Figure 6:
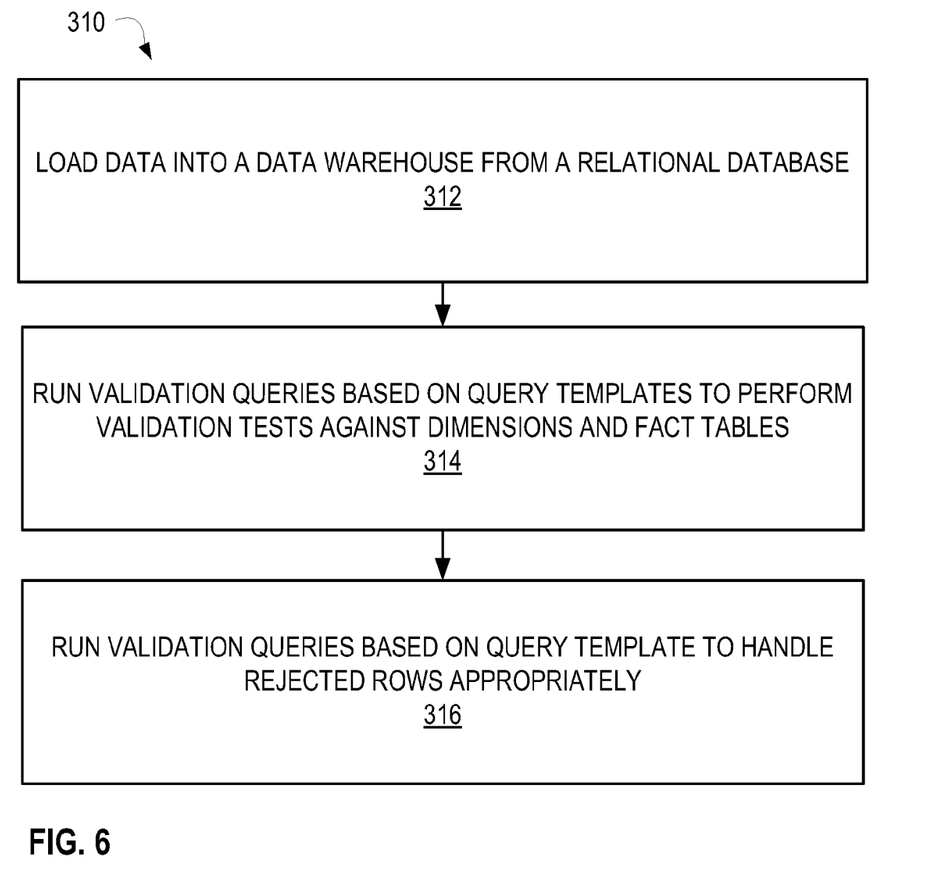
FIG. 6 is a process flow diagram for one implementation illustrating the stages involved in using a data validation module to check data integrity and data completeness of data in a data warehouse.

FIG. 6 is a process flow diagram 310 that illustrates one implementation of the stages involved in using a data validation module to check data integrity and data completeness in a data warehouse. The system loads data into a data warehouse from a relational database (stage 312). The system runs the validation queries based on query templates to perform validation tests against dimensions and fact tables (stage 314). The system also runs validation queries based on query templates to handle rejected rows appropriately (stage 316). These validation queries help ensure that the data integrity and data completeness of the data warehouse has been achieved after the data was transformed from the source data in the original database structure. Some example validation queries and query templates are described in further detail in FIGS. 8-11. Before looking at the example templates and queries, however, an explanation of a transformation process that uses a data validation module (110 on FIG. 1) with these templates will first be discussed in further detail.

Figure 7:
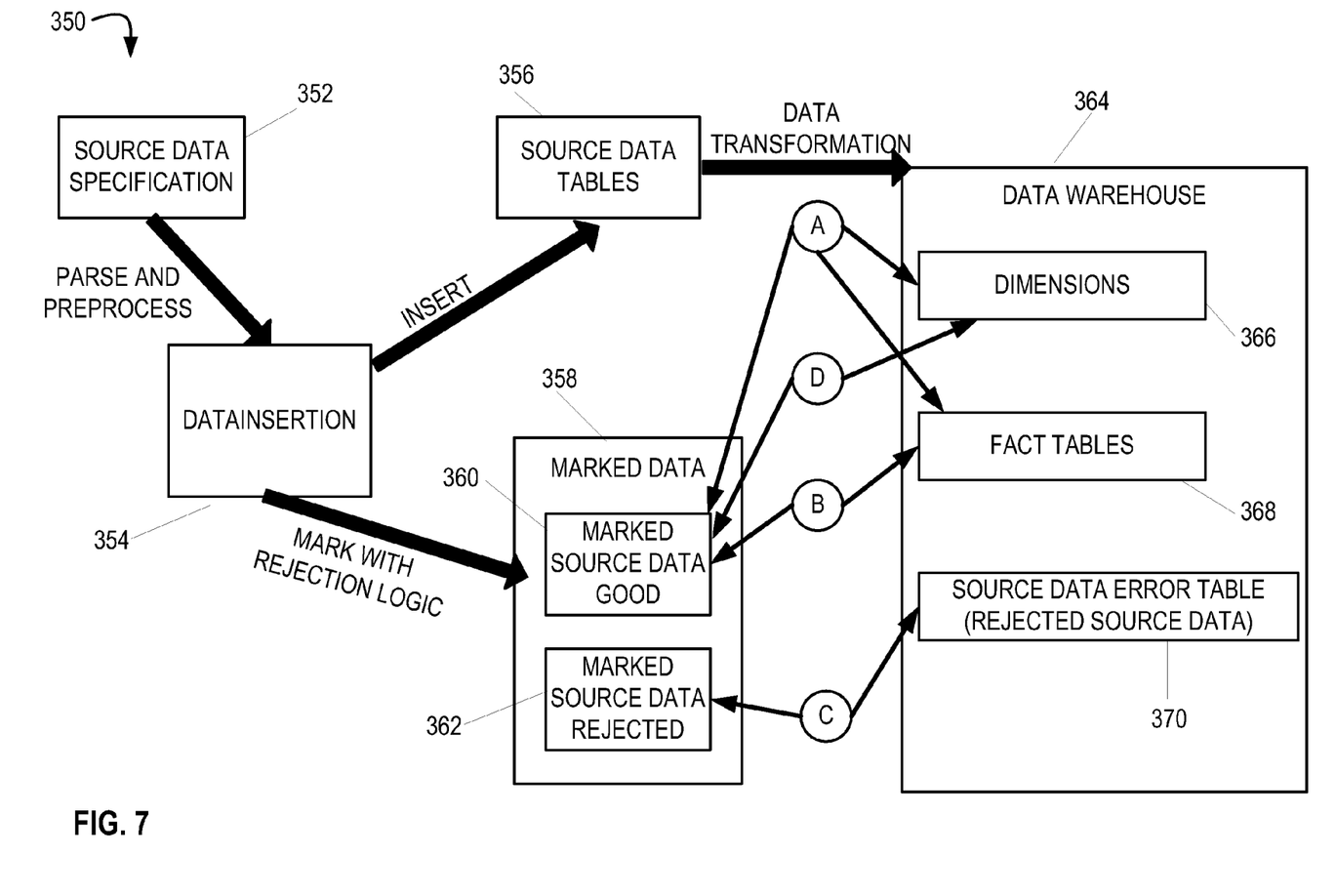
FIG. 7 is a diagrammatic view for one implementation that illustrates a data validation module being used to validate data in the data warehouse.

FIG. 7 is a diagrammatic view for one implementation that illustrates a data validation module 350 being used to validate data in a data warehouse during a transformation process. The source data specification 352 is accessed, and data insertion 354 is performed to insert data into the data warehouse. The source data tables 356 in the relational database are accessed, and logic is used to generate the marked data 358 appropriately. For example, data can be marked as good source data 360, and data can be marked as rejected source data 362. An example process for marking data as good or bad was described earlier in FIG. 5. This marked data 358 and source data tables 356 are then fed to the data warehouse 364. In the example shown in FIG. 7 (and discussed in further detail in FIGS. 8-11), four validation blocks are used to verify the transformation of data that gets inserted into the data warehouse 364. These validation blocks are represented on FIG. 7 with the letters A, B, C, and D. As noted earlier, the validation blocks are provided in the test automation framework as query templates. Validation block A is responsible for verifying data validity and integrity of the dimensions 366 and fact tables 368 in the data warehouse 364, as described in further detail in FIG. 8. Validation block B is responsible for verifying the count of rows in fact tables 368, as described in further detail in FIG. 9. Validation block C is responsible for validating counts of rejected data, as described in further detail in FIG. 10. Validation block D that is responsible for validating dimension counts, as described in further detail in FIG. 11.

While four validation blocks are shown in FIG. 7, in other implementations, fewer and/or additional validation blocks can be used to verify some or all of the data in the data warehouse 364. The four shown in FIG. 7 and discussed herein are just provided for the sake of illustration. Similarly, the exemplary query templates for representing the validation blocks and/or the corresponding example queries for each template that are described in the following sections are just provided for the sake of illustration. These query templates and query examples illustrate validation blocks used in one implementation of a framework for testing a data warehouse. There is nothing in the design that limits the exact query templates to be used, nor the exact query syntax to be used. Any other suitable means for representing one or more extensible query templates and/or for implementing those templates in a specific query for a data warehouse could be used in other implementations. The exemplary query templates and queries that correspond with the four validation blocks (A, B, C, and D) shown in FIG. 7 will now be discussed in more detail.

Figure 8:
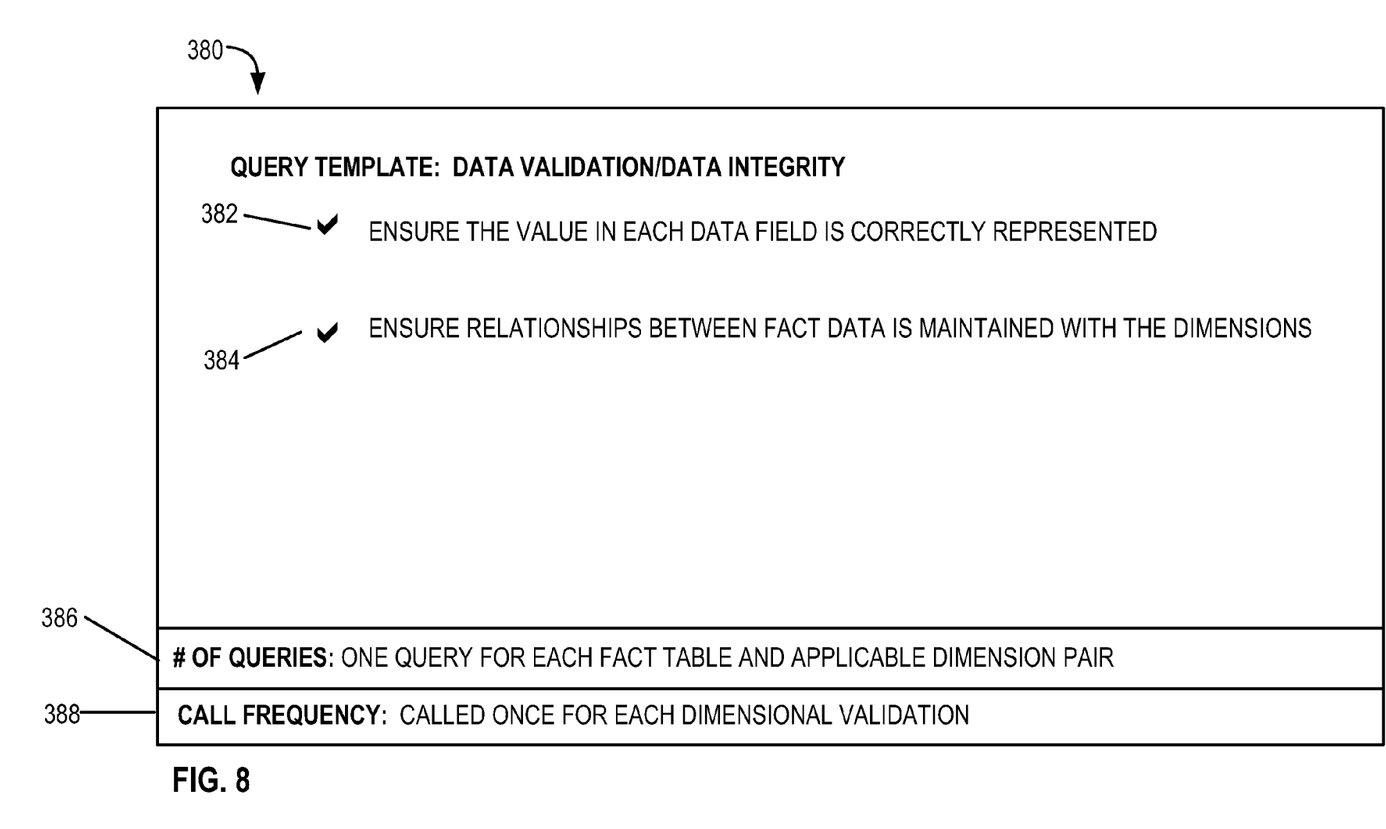
FIG. 8 is a diagrammatic view of one implementation of a data validation/data integrity query template.

FIG. 8 is a diagrammatic view of one implementation of a data validation/data integrity query template 380. The data validation/data integrity query template 380 has a first validation check 382 that is responsible for ensuring that the value in each data field is correctly represented. This first validation check 382 ensures that there will be no truncations of data and that a column value (or group of column values) will be correctly mapped and transformed into the warehouse. The data validation/data integrity query template 380 also has a second validation check 384 that is responsible for data integrity verification. The second validation check 384 ensures that relationships between fact data are maintained within the dimensions. In other words, the second validation check 384 is used to ensure that all non-rejected rows in the source data were extracted and loaded as expected. After an extract-transform-load (ETL) process completes, the second validation check 384 validates that there is not any source data that was missed and that there are not any "extra" rows.

In one implementation, a data warehouse that uses the validation framework described herein has one query 386 that uses the data validation/data integrity template 380 for each fact table and applicable dimension pair. This means that the total number of queries is equal to the number of fact tables times the number of applicable dimension pairs. In such an implementation, the number of times 388 that the query is called is one time for each dimensional validation.

A non-limiting example of a query that uses a data validation/data integrity query template 380 is shown below in a SQL format:

```
SELECT r.BiosName, r.BiosVersion, r.BiosReleaseDate, dbi.[Name],
    dbi.Version, dbi.ReleaseDate
FROM WMT_StagerDW r
JOIN FactInstallEvent Fact ON CONVERT(varchar(36),
    r.EventInstanceID) = Fact.EventID
JOIN DimBios dbi ON Fact.BiosKey = dbi.BiosKey
WHERE ISNULL(r.BiosName, '') <> ISNULL(dbi.[Name], '')
    or ISNULL(r.BiosVersion, '') <> ISNULL(dbi.Version, '')
    or ISNULL(r.BiosReleaseDate, '') <> ISNULL(dbi.ReleaseDate, '')
    or ISNULL(r.ClientSamplingValue, '') <>
    ISNULL(Fact.ClientSamplingValue, '')
```

In the example query shown above, the transformation logic is captured in the WHERE clause. By putting the transformation logic in the WHERE clause of the query, various objectives are achieved in this particular example. First, validation that the ETL process is mapping and transforming the source to the destination appropriately for each column in every raw data row in the database is verified. Second, the referential integrity rules between the Fact table and Dimension are properly maintained.

What the above query does not validate is whether there are any rows in the source data that should have been extracted, transformed, and loaded but that are not present in the destination (or conversely that there are rows in the destination that are mysteriously unaccountable from the source.) For this scenario, the next query template described in FIG. 9 can be used.

Figure 9:
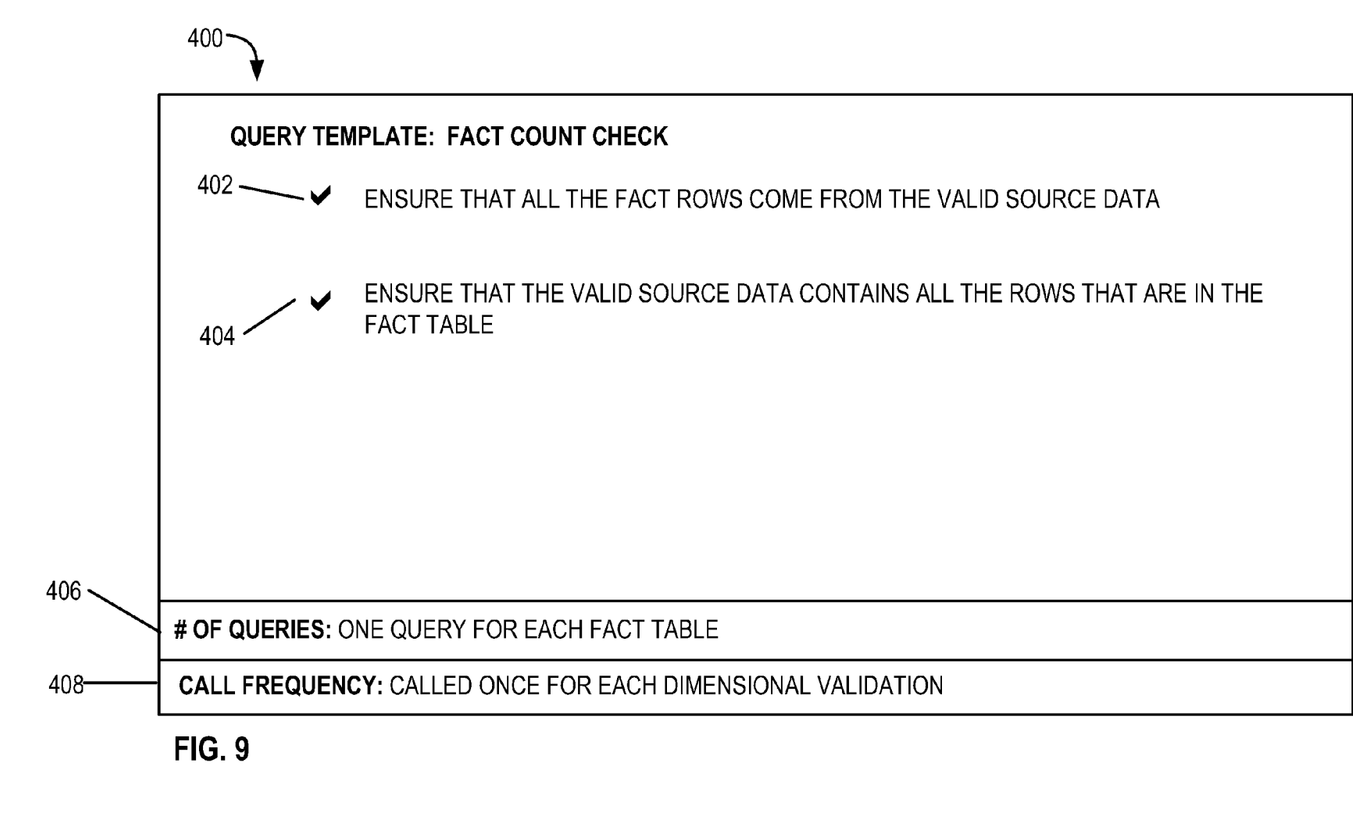
FIG. 9 is a diagrammatic view of one implementation of a fact count check query template.

FIG. 9 is a diagrammatic view of one implementation of a fact count check query template 400. The fact count check query template 400 contains two validation checks. The first validation check 402 is designed to ensure that all fact rows come from the valid source data. The second validation check 404 is designed to ensure that the valid source data contains all the rows that are in the fact table. In other words, the fact count check query template 400 is designed to help detect any valid source data rows that are missing from the fact table or any extra fact rows that did not exist in the valid source data.

In one implementation, a data warehouse that uses the validation framework described herein has one query 406 based upon the fact count check query template 400 for each fact table. In such a scenario, the number of times 408 that each query is called is then once for every dimension validation.

A non-limiting example of a query that uses a fact count check query template 400 is shown below in a SQL format:

```
SELECT r.EventInstanceID, Fact.EventID
FROM (valid source data for Install) AS r
FULL OUTER JOIN FactInstallEvent Fact
ON CONVERT(varchar(36), r.EventInstanceID) = Fact.EventID
WHERE (
    Fact.EventID IS NULL -- the row is the source but not the destination
    AND r.EventID IN (182, 183, 184)
)
OR r.EventInstanceID IS NULL -- the row is in destination but not the source
```

Figure 10:
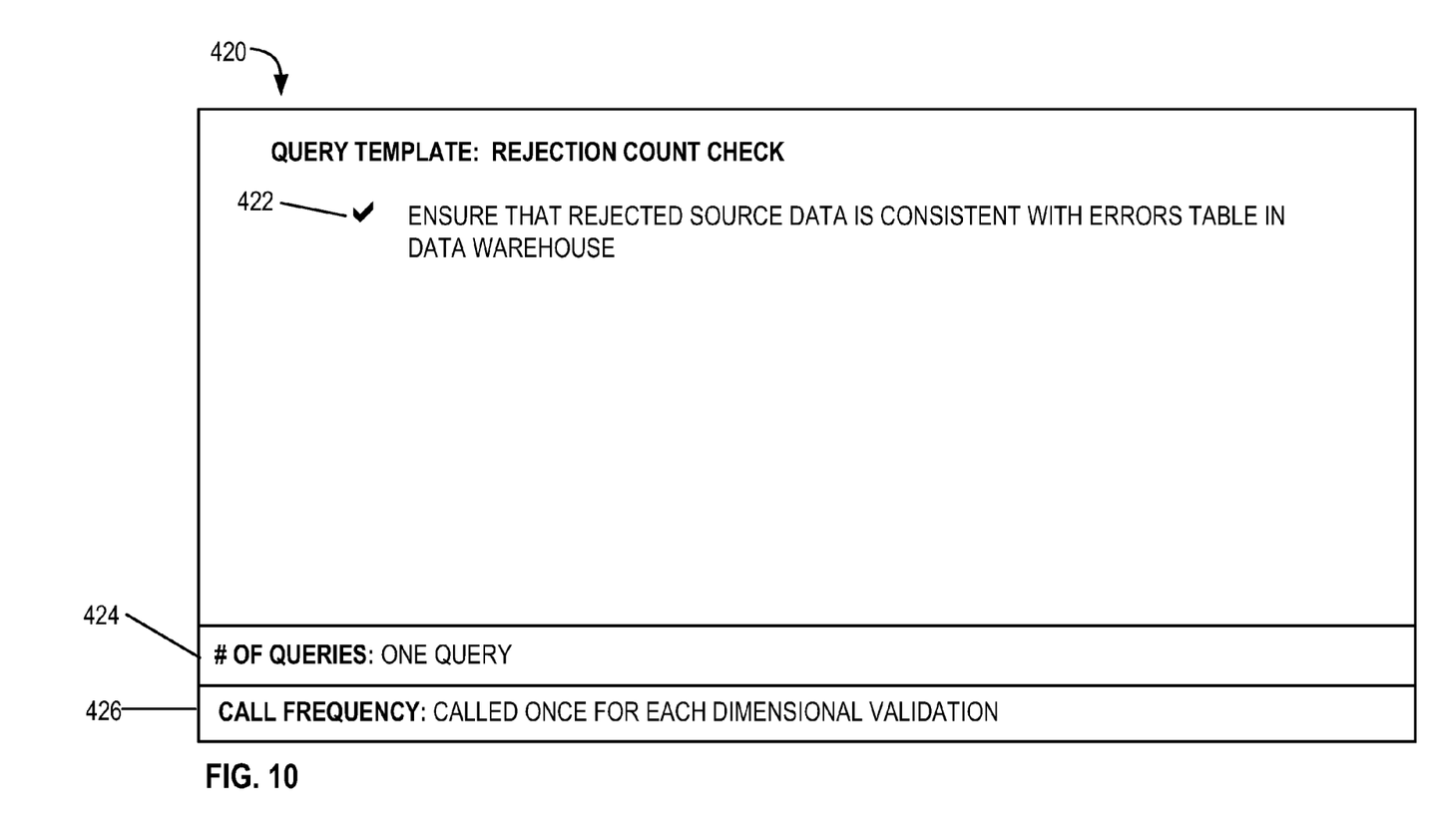
FIG. 10 is a diagrammatic view of one implementation of a rejection count check query template.

Turning now to FIG. 10, a diagrammatic view of one implementation of a rejection count check query template 420 is illustrated. The rejection count check query template 420 contains one validation check that is designed to ensure that rejected source data is consistent with the errors table in the data warehouse.

In one implementation, a data warehouse that uses the validation framework described herein has one query 424 based upon the rejection count check query template 420 for the data warehouse as a whole. In such a scenario, the number of times 426 that the query is called is then once for every dimension validation.

A non-limiting example of a query that uses a rejection count check query template 420 is shown below in a SQL format:

```
SELECT r.EventInstanceID, Error.EventID
FROM (rejected source data) AS r -- false represents we want the rejected rows
FULL OUTER JOIN SourceDataError Error ON CONVERT(varchar(36),
    r.EventInstanceID) = Error.EventInstanceID
WHERE Error.EventInstanceID IS NULL -- the row is in the source but not the destination
OR r.EventInstanceID IS NULL -- the row is in the destination but not the source
```

Figure 11:
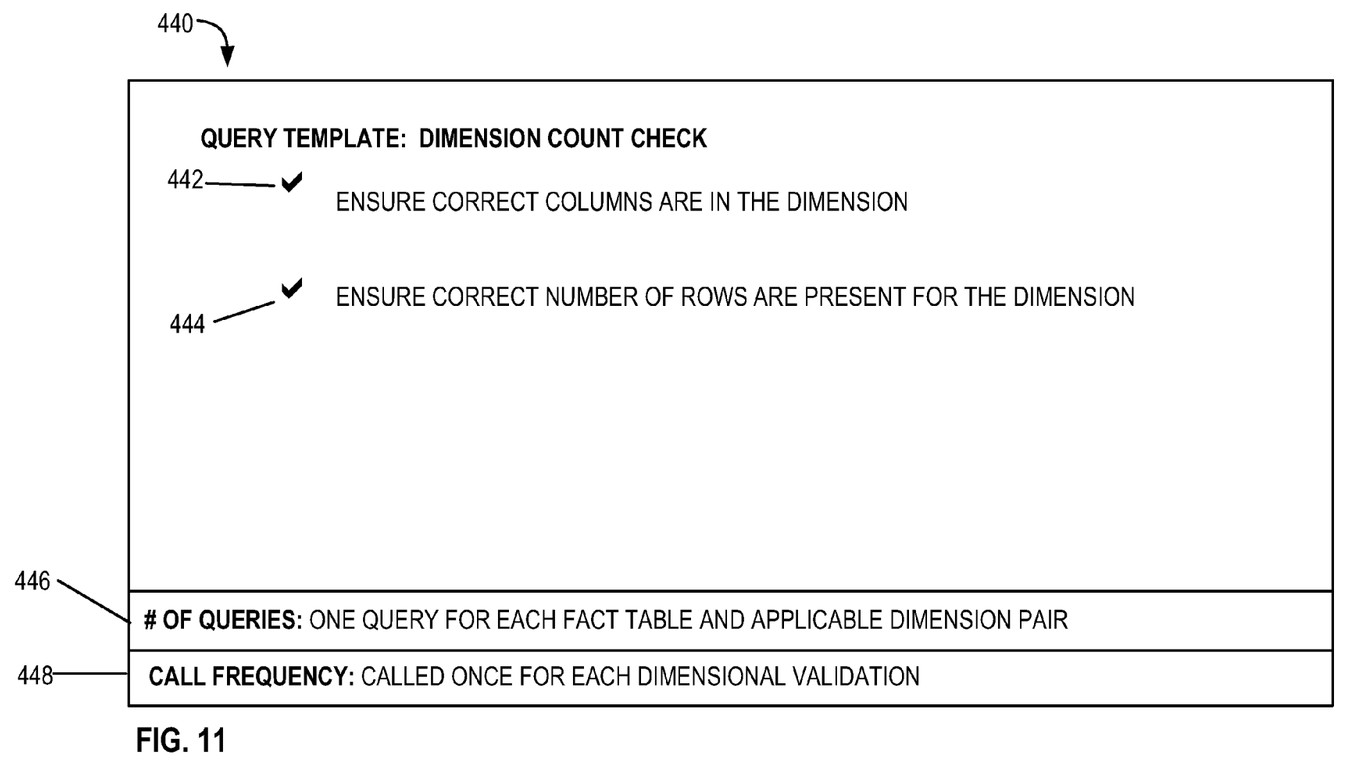
FIG. 11 is a diagrammatic view of one implementation of a dimension count check query template.

FIG. 11 is a diagrammatic view of one implementation of a dimension count check query template 440. The dimension count check query template 440 contains two validation checks. The first validation check 442 is designed to ensure that the correct columns are in the dimension. The second validation check 444 is designed to ensure that the correct number of rows is present for the dimension.

In one implementation, a data warehouse that uses the validation framework described herein has one query 446 for each fact table and applicable dimension pair. In such a scenario, the number of times 448 that the query is called is then once for each dimensional validation.

A non-limiting example of a query that uses a dimension count check query template 440 is shown below in a SQL format:

```
SELECT rd.BiosName, rd.BiosVersion, rd.BiosReleaseDate, dbi.BiosKey
FROM DimBios dbi
RIGHT OUTER JOIN (fnExcludeRejectedData(RawData, true)) AS rd
    -- true represents we want the "good" rows
ON rd.BiosName = dbi.[Name]
    AND rd.BiosVersion = dbi.Version
    AND rd.BiosReleaseDate = dbi.ReleaseDate
WHERE dbi.BiosKey is NULL
```

Figure 12:
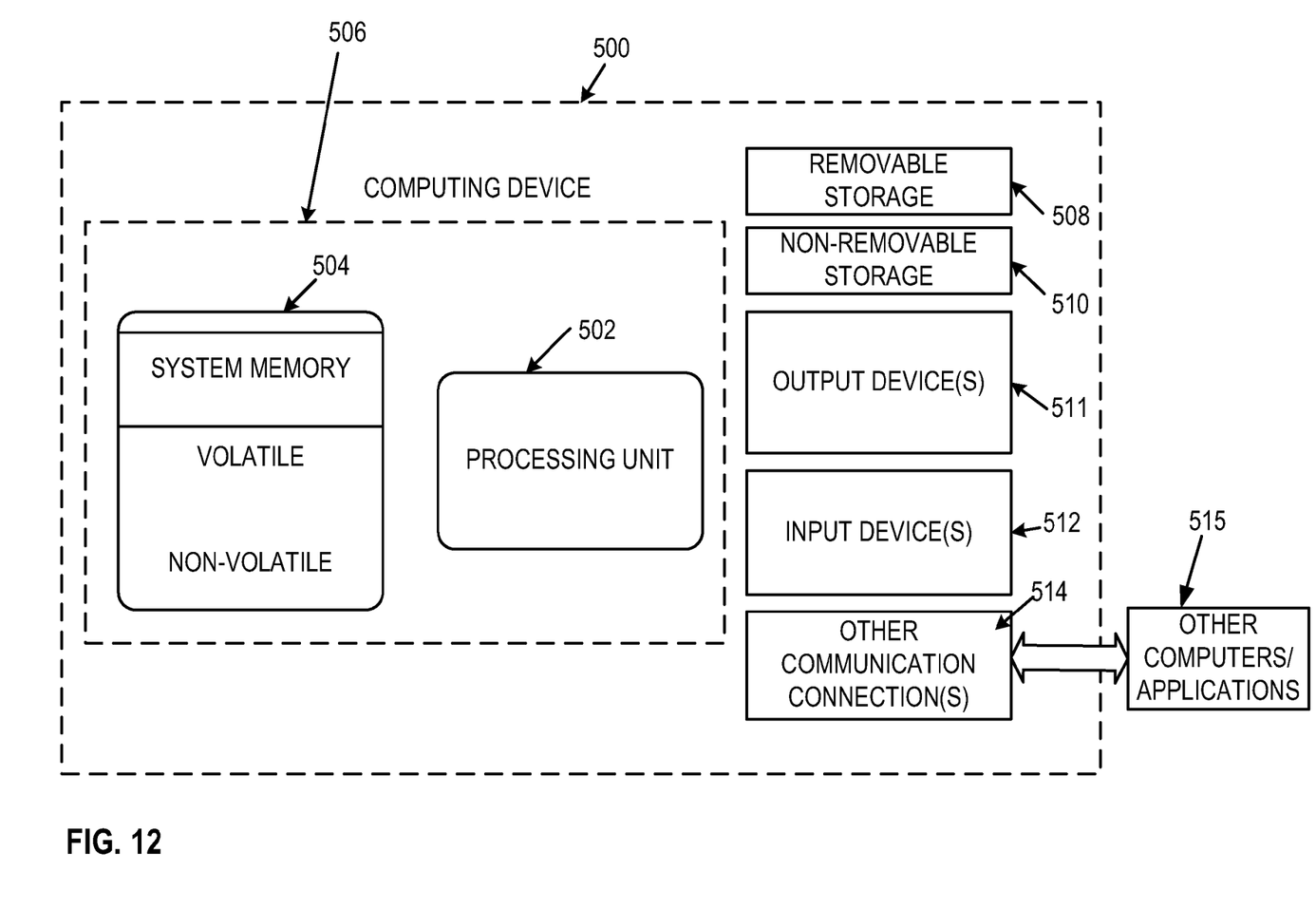
FIG. 12 is a diagrammatic view of a computer system of one implementation.

As shown in FIG. 12, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 12 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 12 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A data warehouse test automation framework system comprising:
 a processing unit coupled to a memory, the processing unit configured to execute the following computer-executable modules stored in the memory:
 a data generation module that is operable to generate source data comprising data scenarios that ensure specific logic is being validated against a data warehouse, at least one data scenario comprising valid and invalid data inserted into source data, the data generation module further operable to pre-process the data inserted into the source data by marking data as either valid or invalid; and
 a data validation module with one or more query templates that are operable to provide specifications for checking destination data in the data warehouse to ensure that the destination data is being properly populated from the generated source data by comparing an expected behavior based on the marked data against an actual warehouse behavior.

2. The system of claim 1, wherein the data generation module is operable to allow a negative test to be run against the data warehouse that focuses on rejection logic.

3. The system of claim 1, wherein the data generation module is operable to allow a positive test to be run against the data warehouse for a subset of source columns.

4. The system of claim 1, further comprising:
 a syntax for enabling dimensions to be modeled in an object oriented programming fashion.

5. The system of claim 1, wherein at least one of the query templates provide specifications for checking data integrity of destination data in the data warehouse.

6. The system of claim 1, wherein at least one of the query templates provides specifications for checking data completeness of destination data in the data warehouse.

7. A computer-readable storage medium comprising:
 a data generation module that is operable to generate source data comprising data scenarios that ensure specific logic is being validated against a data warehouse, at least one data scenario comprising valid and invalid data inserted into source data, the data generation module further operable to pre-process the data inserted into the source data by marking data as either valid or invalid; and
 a data validation module with one or more query templates that are operable to provide specifications for checking destination data in the data warehouse to ensure that the destination data is being properly populated from the generated source data by comparing an expected behavior based on the marked data against an actual warehouse behavior.

8. The computer-readable storage medium of claim 7, wherein at least one of the query templates provides a data validation specification for ensuring that a value in each data field is correctly represented in the data warehouse.

9. The computer-readable storage medium of claim 7, wherein at least one of the query templates provides a data integrity specification for ensuring that relationships between fact data are maintained with dimensions in the data warehouse.

10. The computer-readable storage medium of claim 7, wherein at least one of the query templates provides a fact count check specification for ensuring that all fact rows in a given fact table in the data warehouse come from valid source data.

11. The computer-readable storage medium of claim 7, wherein at least one of the query templates provides a fact count check specification for ensuring that valid source data contains all rows that are in a given fact table in the data warehouse.

12. The computer-readable storage medium of claim 7, wherein at least one of the query templates provides a rejection count check specification for ensuring that rejected source data is consistent with an errors table in the data warehouse.

13. The computer-readable storage medium of claim 7, wherein at least one of the query templates provides a dimension count check specification for ensuring that correct columns are in a given dimension.

14. The computer-readable storage medium of claim 7, wherein at least one of the query templates provides a dimension count check specification for ensuring that a correct number of rows are present for a given dimension.

15. The computer-readable storage medium of claim 7, wherein queries are operable to be run against dimensions and fact tables in the data warehouse to perform validating of the data completeness and data integrity.

16. A method for processing rejections as source data is fed into a data warehouse comprising the steps of:

generating source data comprising data scenarios that ensure specific logic is being validated against the data warehouse, at least one data scenario comprising valid and invalid data inserted into the source data;

feeding the generated source data into the data warehouse;

applying rejection logic to the source data to determine if the source data is valid;

populating a validity indicator for each row of the source data that marks whether each row of the source data is valid;

using the validity indicator with one or more validation query templates to determine whether the source data was transformed into destination data as expected; and populating a rejection reason when the validity indicator specifies that a respective row was rejected, the rejection reason being used with the one or more validation query templates to determine whether the source data was transformed into the destination data as expected.

17. The method of claim 16, wherein the validity indicator designates each row of the source data as either being valid or invalid.

* * * * *